Nov. 19, 1968   S. BARBIERI   3,411,847
LIGHT PROJECTING DEVICE FOR PHOTOGRAPHIC PRINTER
Filed June 17, 1966
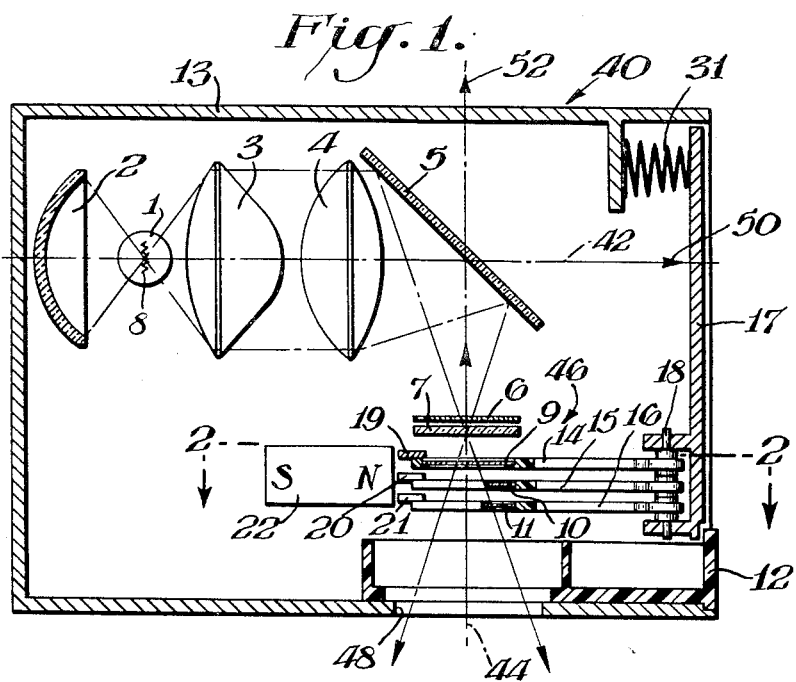
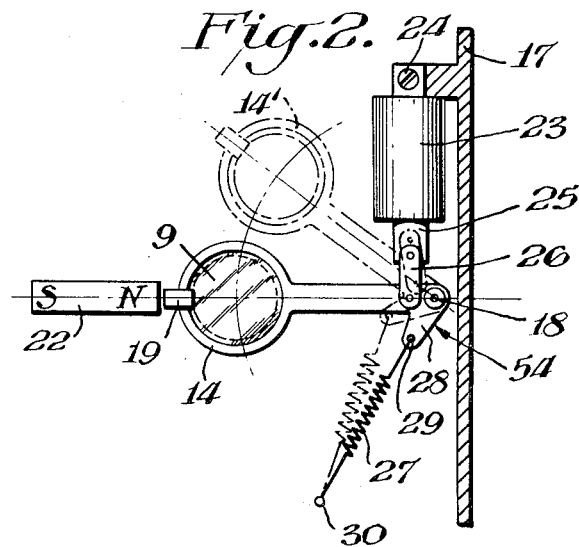

United States Patent Office 3,411,847
Patented Nov. 19, 1968

3,411,847
LIGHT PROJECTING DEVICE FOR
PHOTOGRAPHIC PRINTER
Siegfried Barbieri, Brixen, near Bozen, Italy, assignor to
Durst A.G., Bozen, Italy
Filed June 17, 1966, Ser. No. 558,457
Claims priority, application Italy, Apr. 8, 1966,
8,035/66
15 Claims. (Cl. 355—30)

This invention relates to a colored light projecting device for a photographic enlarger or printer, and it more particularly relates to such a device which is adaptable for printing photographic colored transparencies including negatives by the additive or subtractive color filtering processes.

In enlarging and printing colored photographic transparencies, the three primary colors in the printing light are varied to compensate for chromatic aberrations caused by undesirable lighting conditions occurring during exposure of the transparencies as well as deviations in composition and temperature of the processing baths or in the positive or negative photographic emulsions. These compensations can be accomplished by varying the intensity or time of exposure to the various component colors in the printing light.

Presently two basic types of color exposure are utilized, namely the additive and subtractive processes. In the additive process three successive exposures are made through a blue, green and red filter in amounts that combine to obtain a neutral gray value. Proper color balance is conveniently obtained by varying the time of exposure to the light of each of the primary three colors. The subtractive process utilizes a single exposure to a white light source and proper color balance is conveniently achieved by interposing a series of light filters of various thicknesses or densities of the complementary colors.

The additive process has the disadvantage of poor light utilizing efficiency because only one-third of the white light source is effective at one time. This often unduly prolongs the total exposure time.

One form of the subtractive process requires the use of a number of light filters in the three complementary colors (yellow, cyan and magenta) of various thicknesses or densities. These filters must be collected into groups before each exposure and inserted into the path of light, which is very laborious and time consuming. There are also subtractive processes in which complementary color filters of a uniform thickness are continuously inserted in the path of the light rays to tint them. These however require a light mixing element for evenly dispersing the effect of the different colored filters in the white light beam, which absorbs considerable light. The subtractive process is predominantly used because of its speed and higher efficiency wherever it can be employed, such as in enlarging color negatives on positive paper. On the other hand there are instances, such as in the production of chromatic arrangements from colored diapositives in three-color printing, where use of the additive process is warranted.

An object of this invention is to provide a colored light projecting device for a photographic enlarger or printer which provides maximum light yield and simplicity of conversion from the additive to the subtractive exposure processes.

Another object is to provide such a device which is adaptable to simple and flexible control by photographic cells or programmed controllers.

A further object is to provide a colored light projecting device which minimizes shock and vibration caused by the shifting of filters.

Still a further object is to provide a light projecting device which minimizes the heat transmitted to optical components.

In accordance with this invention a colored light projecting device for a photographic printer or enlarger includes a source of substantially white light having a first optical axis. A variable color filter assembly is mounted along a second optical axis, for example intersecting the first at an angle of 90°. A cold light reflector reflects cold light from the source along the second optical axis through the filter assembly and allows most of the heat rays to pass straight through it. A heat reflecting filter between the cold light reflector and the color filter assembly reflects heat rays back through the cold light reflector and passes substantially cold light along the second optical axis to the color filter assembly. An opaque disc may be inserted between the color filter assembly and the heat reflecting filter for imaging the filament of the lamp.

The color filter assembly is variable and includes movable arms upon which detachable color filters are mounted. These filters are of uniform thickness (otherwise expressed as having uniform density) and optionally of either the primary colors (blue, green and red) for the additive process or the complementary colors (yellow, cyan and magenta) for the subtractive process. In the subtractive process all three filters are initially removed from the optical axis to cause white light to first impinge upon the copy material. The exposures to each of the primary colors are then successively interrupted by interposing respective complementary color filters into the path of light rays. This allows the exposure to each of the three primary colors to proceed simultaneously to the extent that each is required. In the additive process, the exposures through the blue, green and red filters proceed in sequence, and two of the three filters are always removed from the path of the rays.

A drive means is connected to the arms for actuating the insertion and removal of the color filters with a minimal force into the optical axis. This drive means includes a resilient means, such as a spring-operated lever, whose force is minimal when the filter is in the vicinity of the axis. The spring works against a solenoid which pulls the arm and its filter out of the path of light rays. A magnetic aligning means firmly clutches and holds the color filters in line with the optical axis when the drive means moves them into its vicinity and its force becomes minimal. This interposes the filters very smoothly into the optical axis thereby minimizing the mechanical shock, oscillation and vibration transmitted to the enlarging or printing device when the exposure is in process.

Freedom from vibration is further improved by mounting the filter assembly and the drive means on a base plate which is resiliently connected to the housing by soft springs. This practically prevents any vibration and shock whatsoever from being transmitted back to the printing portions of the enlarger.

Novel features and advantages of the present invention will become apparent to one skilled in the art from a reading of the following description in conjunction with the accompanying drawings wherein similar reference characters refer to similar parts and in which:

FIG. 1 is a diagrammatic cross-sectional front view in elevation taken through a colored light projecting device for an enlarging photographic printer which is one embodiment of this invention; and FIG. 2 is a diagrammatic cross-sectional plan view taken through FIG. 1 along the line 2—2.

In FIG. 1 is shown a colored light projecting device 40 for an enlarging photographic printer whose components are mounted within housing 13. Device 40 is for example adjustably mounted upon a column (not shown)

for cooperation with a base (also not shown) of a complete photographic enlarger or printer (also not shown).

A source of substantially white light is provided by lamp 1 whose light beams are reflected by reflector 2 and concentrated by a condenser including lenses 3 and 4 along a first optical axis 42. Cold light reflector 5 deflects the light beams from axis 42 ninety degrees (90°) along a second optical axis 44 which intersects the first. A heat reflective filter 6 and an opaque disc 7 are disposed in succession along second optical axis 44. Condenser lenses 3 and 4 image filament 8 of lamp 1 upon opaque disc 7.

A variable color filter assembly 46 is mounted on second optical axis 44 between heat reflective filter 6 and outlet aperture 48. Filter assembly 46 includes detachable color filters 9, 10 and 11. An additional filter (not shown) may also be inserted within fixed filter holder 12 through which the light beams pass before leaving housing 13 at aperture 48 for exposing the printing material (not shown). Cold light reflector 5 and heat reflective filter 6 cause most of the heat rays in the printing light to pass out through the walls of housing 13 along axes 42 and 44 in the direction of arrows 50 and 52. Most of the heat rays pass directly through cold light reflectors 5 in the direction of arrow 50, and most of the remainder are reflected backwardly from heat reflective filter 6 through cold light reflector 5 in the direction of arrow 52. This prevents the heat rays from being reflected back to lamp 1 or directed through the color filters, thereby minimizing heating of the operative portions of the light projecting device.

Color filters 9, 10 and 11 are detachably mounted in filter holding arms 14, 15 and 16 which are rotatably mounted upon base plate 17 by pivot pin 18 to permit color filters 9, 10 and 11 to be inserted and removed from optical axis 44. Pieces 19, 20 and 21 of magnetic material, such as steel are attached to arms 14, 15 and 16 in positions adjacent permanent magnet 22 when filters 9, 10 and 11 are in optical axis 44. Magnet 22 and magnetic pieces 19, 20 and 21 comprise a magnetic aligning means for firmly clutching and holding color filters 9, 10 and 11 in line with optical axis 44 when they are inserted into it.

Filters 9, 10 and 11 are removed and inserted into the path of light rays along optical axis 44 by drive means 54 connected to arms 14, 15 and 16. Drive means 54 includes solenoids 23 connected to each of the arms, as shown in FIG. 2. Solenoids or electromagnets 23 are rotatably connected by screw connections 24 to base plate 17 and through plungers 25 and links 26 to arms 14, 15 and 16 as represented by the connection to arm 14 shown in FIG. 2.

Drive means 54 also includes a resilient return means for inserting color filters 9, 10 and 11 into the vicinity of optical axis 44. The resilient return means exerts a minimal force upon arms 14, 15 and 16 when they are in the vicinity of optical axis 44 and includes springs 27 connected to lugs 28 on arms 14, 15 and 16 at connecting holes 29. FIG. 2 shows only the connection to arm 14, which is representative of the others. The remote end of spring 27 is anchored to housing 13 at point 30 to minimize the pulling moment upon arm 14 when color filter 9 is in the vicinity of optical axis 44. Spring 27 then accordingly has its line of action substantially aligned with lug 28, hole 29 and axis of rotation 18 of arm 14. When solenoid 23 removes arm 14 to the position 14¹ (shown in FIG. 2 in phantom outline) the line of action of spring 27 shifts (as shown in phantom outline) to apply a maximum returning reaction to arm 14¹. When solenoid 23 is deenergized, spring 27 rotates filter holding arm 14 from position 14¹ back toward optical axis 44. Its pulling force then drops from a maximum to a minimum when the vicinity of optical axis 44 is approached.

When color filter 9 approaches optical axis 44, magnet 22 attracts magnetic piece 19 and rapidly and firmly clutches, aligns and holds color filter 9 in line with optical axis 44 with minimum of oscillation, shock and vibration.

Base plate 17 is connected to housing 13 by resilient means including four soft coil springs 31 at each of its corners. Only one coil spring 31 is illustrated in FIG. 1. This prevents any shock and vibration caused by movement of drive means 54 and variable filter assembly 46 from being transmitted to housing 13 of enlarging light projecting device 40 and to the entire printing or enlarging device.

What is claimed is:

1. A colored light projecting device for a photographic printer comprising a housing, a source of substantially white light in said housing having a first optical axis, a variable color filter assembly in said housing having a second optical axis intersecting said first optical axis, a cold light reflector in said housing at the intersection between said first and second optical axes for directing cold light from said source along said second optical axis and for passing heat rays through it along said first optical axis, a heat reflecting filter between said cold light reflector and said variable color filter assembly for reflecting heat rays back through said cold light reflector and passing substantially cold light along said second optical axis through said variable color filter assembly, said variable color filter assembly including arms and detachable color filter mounting means upon said arms for facilitating replacement of color filters, varying force drive means connected to said arms for actuating the insertion and removal of said color filters into said second optical axis whereby a minimal force is applied to said arms when said color filters are disposed in the vicinity of said second optical axis, and magnetic aligning means reacting between said housing and said arms for firmly aligning said color filters in line with said second optical axis when said drive means moves them into said vicinity whereby vibration is minimized when said color filters are introduced into said second optical axis.

2. A device as set forth in claim 1, wherein said magnetic aligning means comprises magnet means in said housing and magnetic means upon said arms.

3. A device as set forth in claim 2 wherein said magnet means comprises a permanent magnet and said magnetic means comprise pieces of magnetic material upon said arms.

4. A device as set forth in claim 1, wherein said drive means comprises resilient means reacting between said arms and said housing having a shifting line of action whereby the moment exerted by said resilient means upon said arms becomes minimal when said color filters upon said arms are in the vicinity of said second optical axis.

5. The device as set forth in claim 4 wherein said drive means includes solenoid means connected to said arms for moving said arms against the reaction of said resilient means to remove said color filters away from said second optical axis.

6. A device as set forth in claim 1 wherein said color filter assembly and said drive means are mounted upon a base plate, and resilient means connects said base plate to said housing for minimizing the vibration transmitted to said housing from said color filter assembly.

7. A colored light projecting device for a photographic printer comprising a housing, a source of substantially white light in said housing having an optical axis, a variable color filter assembly in said housing along said optical axis, said variable color filter assembly including arms and filters mounted upon said arms, varying force drive means connected to said arms for actuating the insertion and removal of said color filters into said optical axis whereby a minimal force is applied to said arms when said color filters are disposed in the vicinity of said optical axis, and magnetic aligning means reacting between said housing and said arms for firmly aligning said color filters in line with said optical axis when said drive means moves them into said vicinity whereby vibration is minimized when said color filters are introduced into said optical axis.

8. A device as set forth in claim 7, wherein said magnetic aligning means comprises magnet means in said housing and magnetic means upon said arms.

9. A device as set forth in claim 8 wherein said magnet means comprises a permanent magnet, and said magnetic means comprise pieces of magnetic material upon said arms.

10. A device as set forth in claim 7, wherein said drive means comprises resilient means reacting between said arms and said housing having a shifting line of action whereby the moment exerted by said resilient means upon said arm becomes minimal when said color filters upon said arms are in the vicinity of said optical axis.

11. A device as set forth in claim 10 wherein said drive means includes solenoid means connected to said arms for moving said arms against the reaction of said resilient means to remove said color filters from said optical axis.

12. A device as set forth in claim 7 wherein said color filter assembly and said drive means are mounted upon a base plate, and resilient mounting means connects said base plate to said housing for minimizing vibration transmitted to said housing from said color filter assembly and said drive means.

13. A light projecting device for a photographic printer comprising a housing, a source of light in said housing having a first optical axis, an outlet aperture in said housing having a second optical axis intersecting said first optical axis, a cold light reflector in said housing at the intersection between said first and second optical axes for directing cold light from said source along said second optical axis and for passing heat rays through it along said first optical axis, and a heat reflecting filter between said cold light reflector and said outlet aperture for reflecting heat rays back through said cold light reflector and passing substantially cold light along said second optical axis through said outlet aperture whereby the heat reflected back to said light source and through said outlet aperture is minimized.

14. A device as set forth in claim 13 wherein a variable color filter assembly is mounted upon said second optical axis.

15. A device as set forth in claim 14 wherein an opaque disc is disposed between said heat reflecting filter and said color filter assembly.

References Cited

UNITED STATES PATENTS

| 2,822,729 | 2/1958 | Capatosto | 350—315 |
| 2,841,065 | 7/1958 | Gage et al. | 350—315 X |
| 3,255,666 | 6/1966 | Davis et al. | 350—315 |

NORTON ANSHER, *Primary Examiner.*

R. A. WINTERCORN, *Assistant Examiner.*